(12) United States Patent
McCann et al.

(10) Patent No.: US 10,349,341 B2
(45) Date of Patent: Jul. 9, 2019

(54) WIRELESS NETWORK SERVICE TYPE

(71) Applicant: BlackBerry Limited, Waterloo (CA)

(72) Inventors: Stephen McCann, Southampton (GB); Michael Peter Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 137 days.

(21) Appl. No.: 14/158,466

(22) Filed: Jan. 17, 2014

(65) Prior Publication Data
US 2015/0208324 A1     Jul. 23, 2015

(51) Int. Cl.
| | |
|---|---|
| *H04W 48/08* | (2009.01) |
| *H04W 48/10* | (2009.01) |
| *H04W 48/18* | (2009.01) |
| *H04W 80/02* | (2009.01) |
| *H04W 84/12* | (2009.01) |

(52) U.S. Cl.
CPC .......... *H04W 48/10* (2013.01); *H04W 48/08* (2013.01); *H04W 48/18* (2013.01); *H04W 80/02* (2013.01); *H04W 84/12* (2013.01)

(58) Field of Classification Search
CPC .............................. H04W 48/08; H04W 48/10
See application file for complete search history.

(56) References Cited

U.S. PATENT DOCUMENTS

| | | | |
|---|---|---|---|
| 2005/0078644 A1* | 4/2005 | Tsai et al. | 370/338 |
| 2007/0141988 A1* | 6/2007 | Kuehnel | H04W 8/005 455/41.2 |
| 2009/0029691 A1 | 1/2009 | Shen et al. | |
| 2011/0199915 A1 | 8/2011 | Santhanam et al. | |
| 2012/0033568 A1* | 2/2012 | Park | H04W 76/14 370/252 |
| 2012/0076117 A1 | 3/2012 | Montemurro et al. | |

(Continued)

FOREIGN PATENT DOCUMENTS

EP     2487963     8/2012

OTHER PUBLICATIONS

International Search Report and Written Opinion of the International Searching Authority issued in International Application No. PCT/IB2014/067167 dated May 5, 2015; 9 pages.

(Continued)

*Primary Examiner* — Derrick W Ferris
*Assistant Examiner* — Farhad Ali
(74) *Attorney, Agent, or Firm* — Fish & Richardson P.C.

(57) ABSTRACT

A station makes a unidirectional announcement (that is, an indication, notification or advertisement) of types of services that are available to devices in or via a wireless network, for example, a wireless local area network (WLAN). The announcement is receivable by mobile devices within radio communication range of the wireless network that are in the pre-associated state, because the announcement is conveyed using low-level layer 2 frames. A mobile device that receives such a layer 2 frame may determine the announced service type or types from the received layer 2 frame. The mobile device may determine whether it can make use of any of the announced service type or types. The mobile device may provide results of the determination to a network selection algorithm implemented at the mobile device.

15 Claims, 12 Drawing Sheets

(56) References Cited

U.S. PATENT DOCUMENTS

| | | |
|---|---|---|
| 2013/0070644 A1 | 3/2013 | McCann et al. |
| 2013/0070738 A1 | 3/2013 | McCann et al. |
| 2013/0070739 A1 | 3/2013 | McCann et al. |
| 2013/0121325 A1 | 5/2013 | McCann et al. |
| 2013/0174266 A1* | 7/2013 | Smrz .................. H04W 4/003 726/26 |
| 2013/0250803 A1 | 9/2013 | Abraham et al. |
| 2014/0016628 A1 | 1/2014 | McCann et al. |
| 2015/0200811 A1* | 7/2015 | Kasslin .................. H04L 41/12 370/254 |

OTHER PUBLICATIONS

Extended European Search Report issued in EP Application No. 14878408.5 dated Jun. 22, 2016; 8 pages.
Communication Pursuant to Article 94(3) EPC issued in EP Application No. 14878408.5 dated Mar. 15, 2018; 6 pages.

* cited by examiner

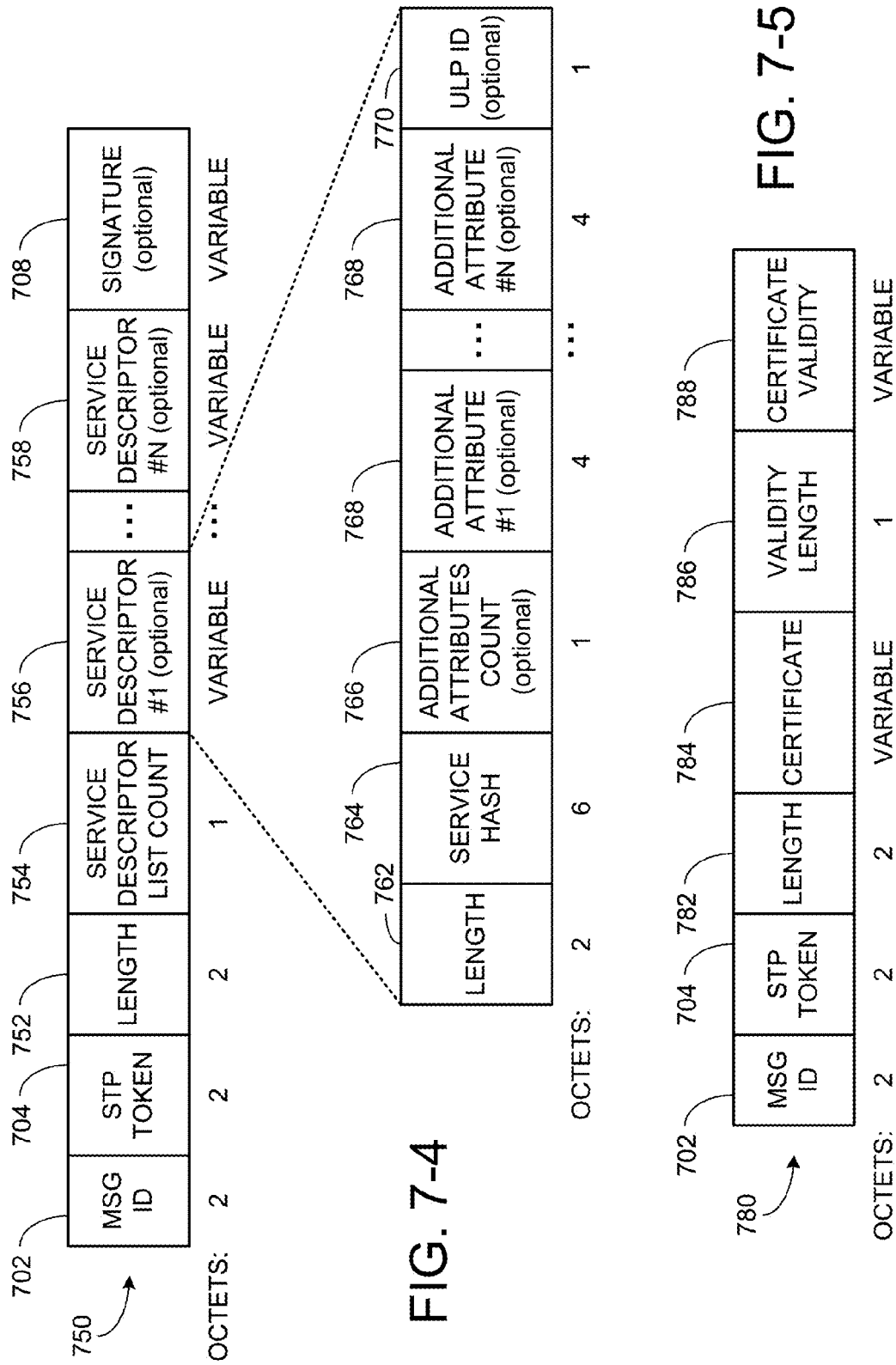

WIRELESS NETWORK SERVICE TYPE

TECHNICAL FIELD

The technology described herein generally relates to wireless local area networks (WLANs), and more particularly, to the pre-association discovery of available services in a WLAN.

BACKGROUND

Wireless network deployments, such as wireless local area networks (WLANs), allow mobile devices to access network and Internet services when within proximity of wireless communication signals of those wireless networks.

Different networks provide different network information for wireless clients. Access Network Query Protocol (ANQP) may allow the mobile device to request additional network information prior to establishing network connectivity. Such network information may include access to particular subscription service provider (SSP) networks (SSPN), roaming agreements to allow connections from wireless clients associated with different SSPs, authentication capabilities to enable secure communications, support for emergency services, support for particular types of multi-media access (e.g., audio and/or video streaming, downloading, etc.), or support for other types of network services. However, other network information not provided by ANQP, such as the availability of third party services, may only be provided upon a connection or association with that network. Depending on the services available, a device may need to disconnect or disassociate with that network and pursue a different network.

SUMMARY

A simplified service discovery mechanism is proposed in this document. The simplified service discovery mechanism is a unidirectional announcement (that is, an indication, notification or advertisement) of types of services that are available to devices in or via a wireless network, for example, a wireless local area network (WLAN). The announcement is receivable by mobile devices within radio communication range of the wireless network that are in the pre-associated state, because the announcement is conveyed using low-level layer 2 frames. For example, the announcement may be conveyed using management frames that are generated within the MAC sublayer module. The announcement may also be receivable by mobile devices within radio communication range of the wireless network that are in an associated state with respect to the wireless network.

A mobile device that receives such a layer 2 frame may determine the announced service type or types from the received layer 2 frame. The mobile device may determine whether it can make use of any of the announced service type or types. The mobile device may provide results of the determination to a network selection algorithm implemented at the mobile device.

BRIEF DESCRIPTION OF THE DRAWINGS

FIG. 3-1 is a simplified flowchart illustration of an example service type discovery method to be performed by a mobile device that is within radio communication range of a wireless network;

FIG. 3-2 is a simplified flowchart illustration of an example augmented service type discovery method to be performed by a mobile device that is within radio communication range of a wireless network;

FIG. 7-1 illustrates example formatting information for a service query request message;

FIG. 7-2 illustrates example formatting information for a service query response message;

FIG. 7-3 illustrates example formatting information for a service descriptor request message;

FIG. 7-4 illustrates example formatting information for a service descriptor response message;

FIG. 7-5 illustrates example formatting information for a certificate message;

DETAILED DESCRIPTION

Figure 1:
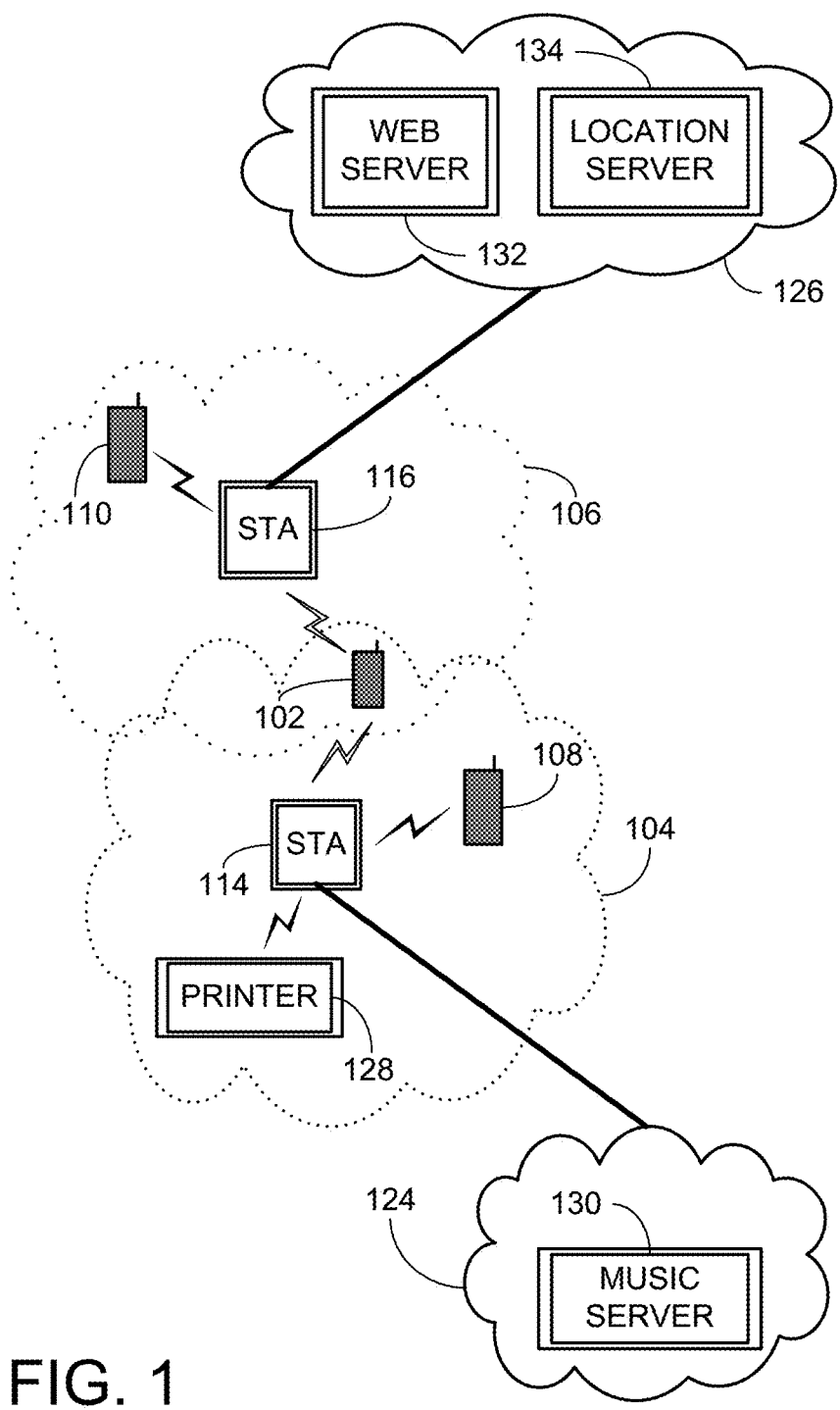
FIG. 1 is a simplified illustration of an example environment in which a mobile device is within radio range of a wireless network.

The disclosure can be better understood with reference to the following drawings and description. The components in the figures are not necessarily to scale, emphasis instead being placed upon illustrating the principles of the disclosed technology. Moreover, in the figures, like referenced numerals designate corresponding parts or elements throughout the different views. The following description is merely exemplary in nature and is in no way intended to limit the disclosure, its application, or uses.

The seven-layer Open Systems Interconnection (OSI) Reference Model is a concept that describes how data communications should take place. A Physical Layer 1 is the first (lowest) layer. A Data Link Layer 2 has two sub-layers: the upper Logical Link Control (LLC) sub-layer establishes and maintains links between communicating devices; the lower Media Access Control (MAC) sub-layer controls how devices share a media channel. A Network Layer 3 provides switching and routing technologies. Internet Protocol (IP) is the most significant protocol at Layer 3. The other layers are a Transport Layer 4, a Session Layer 5, a Presentation Layer 6, and an Application Layer 7. For the purposes of this document, the term "upper layer protocol (ULP)" refers to a protocol implemented at any of Layer 3 through Layer 7. In the event that the communication architecture is not precisely in accordance with the seven-layer OSI Reference Model, the term "ULP" refers to a protocol implemented at any layer or layers higher than Data Link Layer 2.

A mobile device that is in a pre-associated state with respect to a wireless network is connected to the wireless network via a layer 2 radio service. However, a mobile device that is in the pre-associated state does not have a connection within the wireless network at any of the layers higher than layer 2 and is unable to communicate within the wireless network using any of the ULPs. That is, a user plane has not yet been established between the mobile device and the wireless network. For example, no session keys have been established and no IP address is assigned to the mobile device.

The IEEE Std. 802.11™-2012 published 29 Mar. 2012 by IEEE Computer Society explains that a mobile device can operate in one of four connection states:

State 1: Initial start state, unauthenticated, un-associated
State 2: Authenticated, not associated
State 3: Authenticated and associated (Pending Robust Security Network Authentication)
State 4: Authenticated and associated.

In the case where the mobile device is compatible (wholly or partially) with the IEEE Std. 802.11™-2012 or future related standards, the pre-associated state refers to the "State 1" connection state or to the "State 2" connection state. According to the IEEE Std. 802.11™-2012, no user plane data traffic is permitted while the mobile device is in the "State 1" connection state or in the "State 2" connection state, and any signaling information is insecure and cannot be guaranteed.

A simplified service discovery mechanism is proposed in this document. The simplified service discovery mechanism is a unidirectional announcement (that is, an indication, notification or advertisement) of types of services that are available to devices in or via a wireless network, for example, a wireless local area network (WLAN). The announcement is receivable by mobile devices within radio communication range of the wireless network that are in the pre-associated state, because the announcement is conveyed using low-level layer 2 frames. For example, the announcement may be conveyed using management frames that are generated within the MAC sublayer module. The announcement may also be receivable by mobile devices within radio communication range of the wireless network that are in an associated state with respect to the wireless network. In the case where the mobile device is compatible (wholly or partially) with the IEEE Std. 802.11™-2012 or future related standards, the associated state refers to the "State 3" connection state or to the "State 4" connection state.

A service may be understood generally as anything required so that an application on a mobile device works as intended. That is, the running of an application on the mobile device may need certain requirements and/or resources from the network for full operation, and those requirements and/or resources may be referred to as services. In other words, a service is a resource accessible via a network that is typically utilized by an application on a mobile device. For example, a service may be a peripheral such as a printer, or a camera, or a scanner, or a power supply, or an electronic writing tablet. In another example, a service may be a web service, which can be understood as any information carried by HyperText Transfer Protocol (HTTP). Examples of web services include connection to audio translation services, connection to a specific type of web page format server, and the like. In a further example, a service may be a streaming multimedia service, such as music streaming, video streaming, television streaming, and the like. In yet another example, a service may be an interactive multimedia service, such as social media, gaming, use of IP Multimedia Subsystem (IMS), a Voice over IP session, and the like. In yet another example, a service may be a location based service, such as a connection to a location server in a network.

A service may be identified by a well-known standardized hash value ("service hash") which is computable by all stations (STA). For example, the service hash 0x8076b8ab6 may identify the service 'Printer with Duplex Printing', and the service hash 0x9042dd3r5 may identify the service 'Free Music Player supporting the .mp3 format', and the service hash 0xe67bbe911 may identify the service 'e911 emergency call with video capability'.

This document proposes that types of services are defined, and particular services are categorized as being of one of the defined service types. In this document, the following example service types are defined: 'Peripheral', 'Web Service', 'Streaming Multimedia', 'Interactive Multimedia', and 'Location Based Services'. Other service types and/or additional service types are contemplated. The defined service types are generally known to all mobile devices and stations (STAs) and are therefore not typically advertised. In various implementations, the service types may be advertised by mobile devices and/or stations.

FIG. 1 is a simplified illustration of an example environment in which a mobile device is within radio range of a wireless network. In the example environment illustrated in FIG. 1, a mobile device 102 is within range of a wireless network 104 and within range of a wireless network 106. The mobile device 102 is in the pre-associated state with respect to the wireless network 104 and with respect to the wireless network 106. A mobile device 108 is within range of the wireless network 104 and is in the associated state with respect to the wireless network 104. A mobile device 110 is within range of the wireless network 106 and is in the associated state with respect to the wireless network 106. A station (STA) 114, such as a mobile device, a mesh node or an access point, supports the wireless network 104, and a STA 116 supports the wireless network 106.

The wireless network 104 provides access to a private network 124, and the wireless network 106 provides access to an external network 126, for example, the Internet. Printing services are available from a printer 128 located within the wireless network 104, and music streaming services are available from a music server 130 located in the private network 124. Web services are available from a web server 132 located in the external network 126 and location based services are available from a location server 134 located in the external network 126. Accordingly, a service of the type 'Peripheral' is available within the wireless network 104 and a service of the type 'Streaming Multimedia' is accessible via the wireless network 104. Likewise, services of the types 'Web Service' and 'Location Based Services' are accessible via the wireless network 106.

Figure 2:
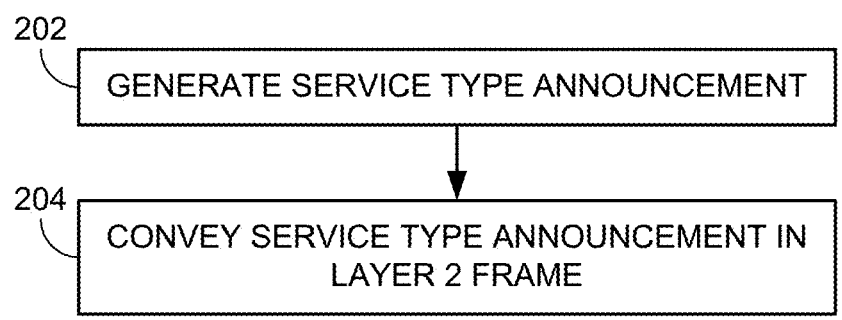
FIG. 2 is a simplified flowchart illustration of an example service type announcement method to be performed in a wireless network, for example, by station (STA), such as a mobile device, a mesh node, or an access point.

FIG. 2 is a simplified flowchart illustration of an example service type announcement method to be performed in a wireless network, for example, by a STA, such as STA 114 and STA 116. The STA generates (at 202) an announcement (that is, an indication, notification or advertisement) of the type or types of services that are available within or accessible via the wireless network. For example, the STA 114 may generate an announcement that services of the types 'Peripheral' and 'Streaming Multimedia' are available within or accessible via the wireless network 104, and the STA 116 may generate an announcement that services of the types 'Web Service' and 'Location Based Services' are available within or accessible via the wireless network 106. The announcement may optionally also identify which upper layer protocols (ULPs), if any, are available within or accessible via the wireless network. The STA may store in its memory indications of which service types are available within or accessible via the wireless network and which ULPs are available within or accessible via the wireless network. Those indications may be provisioned within the STA by its owner in a manual fashion, or by a remote control server that manages the STA, or by a protocol that provisions the STA over a backhaul network, or by a protocol over-the-air from the mobile device of an administrator or engineer. The indications may be updated dynamically.

Responsive to generating the service type announcement, the STA conveys (at 204) the announcement in a layer 2 frame, which is ultimately transmitted over a radio interface so that it is receivable by a mobile device in the pre-associated state. (The announcement may also be receivable by mobile devices that are in the associated state.) For example, the layer 2 frame transmitted by the STA 114 is receivable by the mobile device 102 and may also be receivable by the mobile device 108, and the layer 2 frame transmitted by the STA 116 is receivable by the mobile device 102 and may also be receivable by the mobile device 110.

For example, the layer 2 frame may be a MAC management frame transmitted by a STA. A beacon frame, which is generally broadcast by a STA, is an example of a MAC management frame that may convey the announcement. A probe response frame is another example of a MAC management frame that may convey the announcement. A mobile device may broadcast a probe request frame to discover wireless networks within radio range. A STA receiving the probe request frame may respond with a probe response frame that is unicast to the mobile device that sent the probe request frame. Beacon frames and probe response frames are receivable by mobile devices within radio communication range of the wireless network in the pre-associated state and by mobile devices within radio communication range of the wireless network in the associated state. Therefore any announcements conveyed by both those frames are receivable by mobile devices within radio communication range of the wireless network in the pre-associated state (for example, the mobile device 102) and by mobile devices within radio communication range of the wireless network in the associated state (for example, the mobile device 108 or the mobile device 110).

The announcement may be in the form of a Service Type Announcement element included in the layer 2 frame. Example formatting information for a Service Type Announcement element is discussed below with reference to FIG. 6.

Figures 1, 3:
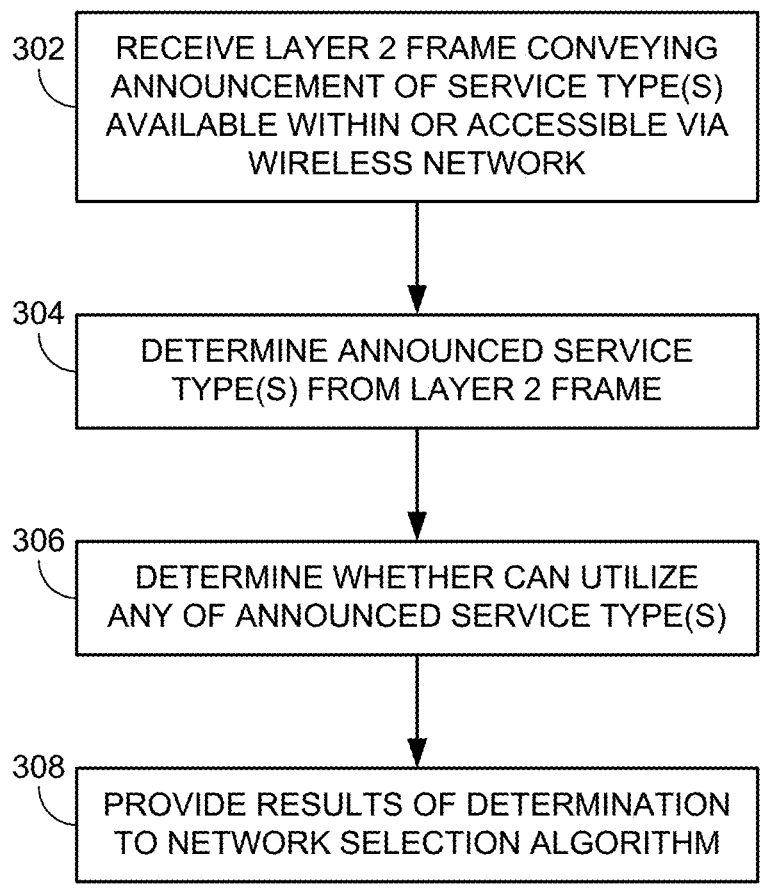
Figures 2, 3:
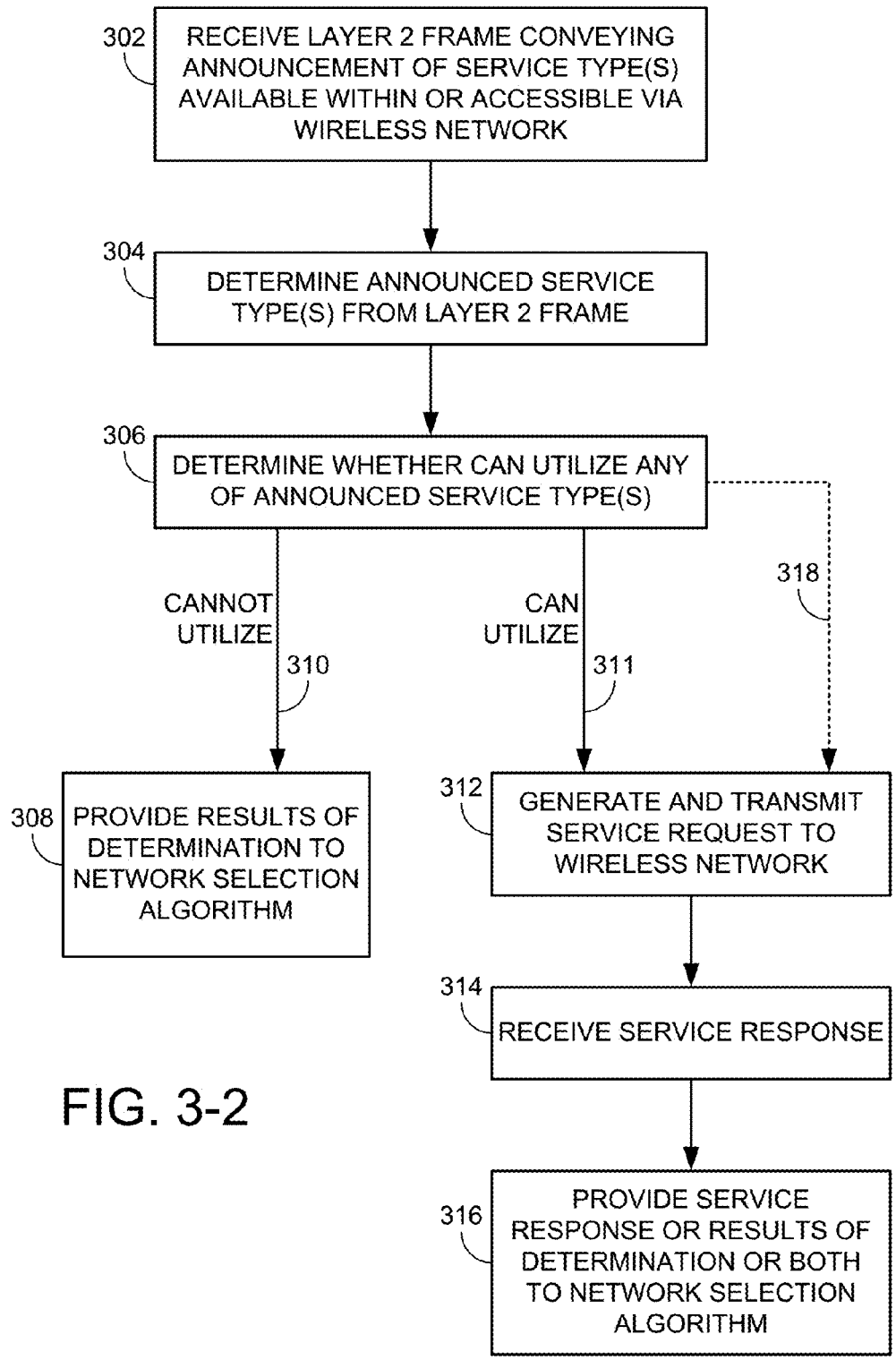

FIG. 3-1 is a simplified flowchart illustration of an example service type discovery method to be performed by a mobile device that is within radio communication range of a wireless network. The mobile device may be in the pre-associated state with respect to the wireless network during the performance of this service type discovery method, such as the mobile device 102.

The mobile device receives (at 302) a layer 2 frame that conveys an announcement (that is, an indication, notification or advertisement) of the type or types of services that are available within or accessible via the wireless network. The announcement may optionally also identify which upper layer protocols (ULPs), if any, are available within or accessible via the wireless network. The announcement may be in the form of a Service Type Announcement element included in the layer 2 frame. Example formatting information for a Service Type Announcement element is discussed below with reference to FIG. 6.

Responsive to receiving that layer 2 frame, the mobile device may determine (at 304) the announced service type or types (and, if present, any identifiers of ULPs) from the received layer 2 frame.

Responsive to determining the announced service type or types (and, if present, any identifiers of ULPs) from the received layer 2 frame, the mobile device determines (at 306) whether the mobile device may make use of any announced service type conveyed by the received layer 2 frame. For example, the mobile device may compare the announced service type or types to a service table stored internally (that is, locally) at the mobile device. The comparison may involve comparison of numeral values assigned to different types of services. Alternatively, the comparison may involve comparison of text strings that describe or represent the different types of services. For example, the service table may relate particular services required by applications on the mobile device to the types of services that are defined. Records of the service table may be of the form particular service—service type, with the expectation that different particular services categorized by the same service type result in different records. In another example, the service table may simply be a list of the types of services that categorize the various particular services required by applications on the mobile device. In a further example, applicable to the case where the announcement includes identifiers of the ULPs that are available within or accessible via the wireless network, records of the service table may be of the form particular service—ULP—service type.

Responsive to determining whether the mobile device may make use of any of the announced service type or types, the mobile device may provide (at 308) results of the determination to a network selection algorithm implemented in the mobile device. The network selection algorithm implemented in the mobile device may base its decision, in whole or in part, whether to select the wireless network for an association attempt on the results of the determination. For example, if the determination indicates that none of the particular services required by applications on the mobile device constitutes a service within a category of the announced service type or types for that wireless network, the network selection algorithm may avoid attempts to associate with that wireless network. The network selection algorithm may use the results of the determination to prioritize selection or association attempts in the event that the mobile device is within radio communication range of more than one STA that is conveying announcements of service type. For example, if the mobile device is within radio range of two different wireless networks and the service type discovery method is respectively performed for layer 2 frames received from both wireless networks, with the result that a first of the wireless networks announces a service type and a second of the wireless networks does not announce that service type, and a particular service required by an application on the mobile device constitutes a service within a category of that service type, the network selection algorithm may prefer the first of the wireless networks over the second of the wireless networks.

FIG. 3-2 is a simplified flowchart illustration of an example augmented service type discovery method to be performed by a mobile device that is within radio communication range of a wireless network. The mobile device may be in the pre-associated state with respect to the wireless network during the performance of this service type discovery method.

This augmented service discovery method differs from the service type discovery method described above with respect to FIG. 3-1 in that a determination (at 306) that the mobile device may make use of the announced service type or types may lead to a bidirectional exchange of query and response for one or more services. Responsive to determining that the mobile station cannot utilize the announced service type or types (as illustrated by an arrow 310), the mobile device may provide (at 308) results of the determination to a network selection algorithm implemented in the mobile device, as described above with respect to FIG. 3-1. However, responsive to determining that the mobile station can utilize the announced service type or types (as illustrated by an arrow 311), the mobile device may generate and transmit (at 312) a service request to the wireless network. The service request may be a request for information regarding a specific service categorized by an announced service type (and, optionally, implemented by an identified ULP). Examples of service requests (namely service query requests and service descriptor requests) are described below with respect to FIG. 7-1 and FIG. 7-3. Because the mobile device may be in the pre-associated state, the service request may be conveyed by a layer 2 frame. Responsive to generating and transmitting the service request, the mobile device may receive (at 314) a service response to the service request, also conveyed by a layer 2 frame. For example, if the service request is a query as to whether a specific service is available within or accessible via the wireless network, the service response may be an indication of the availability of the specific service in or via the wireless network. Examples of service responses (namely service query responses and service descriptor responses) are described below with respect to FIG. 7-2 and FIG. 7-4. Responsive to receiving the service response, the mobile device may provide (at 316) the service response or the results of the determination or both to the network selection algorithm.

As an alternative, the augmented service discovery method may involve generating and transmitting a service request regardless of the results of the determination (at 306). This alternative is illustrated via an arrow 318 in FIG. 3-2.

The simplified service discovery method of actions 302 through 308 may therefore eliminate unnecessary messaging between the mobile device and the wireless network. A determination (at 306) that the mobile device cannot make use of the announced service type or types may avoid the bidirectional exchange of a service request and a service response for one or more specific services. As discussed below, a bidirectional exchange of a service request and a service response may result in a delay of up to 10 seconds and may also involve resending of the service request, which in turn may delay the selection of a network with which to attempt association. The simplified service discovery method of actions 302 through 308 may therefore avoid such delays.

Generation of the service request (at 312) by the mobile device may involve computations that take some time. To reduce the computational burden on the mobile device and to shorten the time to generate the service request, the service table may relate particular services required by applications on the mobile device to the types of services that are defined and to service request codes. For example, records of the service table may be of the form particular service—service type—service request code, where a service request code can be used as a component of a service request. In this manner, the mobile device may simply look up the appropriate service request code in the service table and use it as a component of a service request. The mobile device may, in this manner, avoid computation of service request codes, thus reducing the computational burden on the mobile device and shortening the time to generate the service request.

In some implementations, a service request code may be a well-known standardized hash value ("service hash") which may be computed by applying a hashing algorithm to a text string identifying the service.

An example service table appears in the following table:

TABLE 1

Example Service Table

| Upper Layer Protocol | Service Type | Service Hash | Attributes | Service Descriptor |
| --- | --- | --- | --- | --- |
| UPnP | Peripheral | 0x8076b8ab6 | <Location>, <cost> | http: // myPrinter |
| Bonjour ® | Peripheral | 0x9042dd3r5 | <audio_bandwidth> | http: // freeMusic |
| NG911 | Interactive Multimedia | 0xe67bbe911 | <Location> | http: // emergencyVideoCall |
| Bonjour ® | Interactive Multimedia | 0xc367453ed | <cost> | sip: // chat |
| UPnP | Web Service | 0x104c3de00 | <cost>, <size> | http: // printerDriver |
| Video | Streaming Multimedia | 0x880d37c89 | <video_bandwidth> | http: // video |
| Location Service | Location Based Service | 0xd578ca6c8 | <accuracy> | http: // storeAdvertisements |

For example, a mobile device that is in the pre-associated state may store the service table in its memory so that it is accessible by the MAC controller. A particular service of accessing a printer with duplex printing is represented in this example service table by a record having five entries. The ULP entry identifies the ULP used to discover the particular service. In this example, the particular service of accessing a printer with duplex printing is discoverable using the Universal Plug and Play (UPnP) upper layer protocol. The Service Type entry identifies the category to which the particular service belongs. In this example, the particular service of accessing a printer with duplex printing is a service of the category 'Peripheral' service type. The Service Hash entry identifies a specific service. Responsive to determining the announced service type 'Peripheral' from a layer 2 frame, the mobile device may retrieve the service hash value 0x8076b8ab6 from the service table in order to include it in a service request. The Attributes entry identifies the one or more attributes (if any) that will be provided with values in the service response to the service request. A service request that conveys the service hash value 0x8076b8ab6 is equivalent to asking whether the service 'Printer with Duplex Printing' is available. The service response may return a negative response or a positive response to this request, together with attributes indicating the location and cost of the available specific printer service. The mobile device interprets the attribute values received in the service response according to the Attribute indicators in the service table. The Service Descriptor entry may be retrieved from the service table so that the internal universal resource locator (URL) http://myPrinter is used by the mobile device for its internal software and drivers. In the case of a negative response, return codes may also be contained in the service response, in the place of the attribute fields.

A particular service of accessing free music is discoverable using the Bonjour® upper layer protocol and belongs to the category 'Peripheral' service type. Responsive to determining the announced service type 'Peripheral' from a layer 2 frame, the mobile device may retrieve the service hash value 0x9042dd3r5 from the service table in order to include it in a service request. A service request that conveys the hash value 0x9042dd3r5 is equivalent to asking whether the service 'free music player supporting the .mp3 format' is available. The mobile device interprets the attribute value received in the service response as indicative of an audio bandwidth, and retrieves the Service Descriptor entry from the service table so that the internal URL http://freeMusic is used by the mobile device for its internal software and drivers.

A particular Next Generation (NG) Emergency Service is discoverable using the NG911 upper layer protocol and belongs to the category 'Interactive Multimedia' service type. Responsive to determining the announced service type 'Interactive Multimedia' from a layer 2 frame, the mobile device may retrieve the service hash value 0xe67bbe911 from the service table in order to include it in a service request. A service request that conveys the hash value 0xe67bbe911 is equivalent to asking whether the service 'e911 emergency call with video capability' is available. The mobile device interprets the attribute value received in the service response as indicative of a location, and retrieves the Service Descriptor entry from the service table so that the internal URL http://emergencyVideoCall is used by the mobile device for its internal software and drivers.

Figure 4:
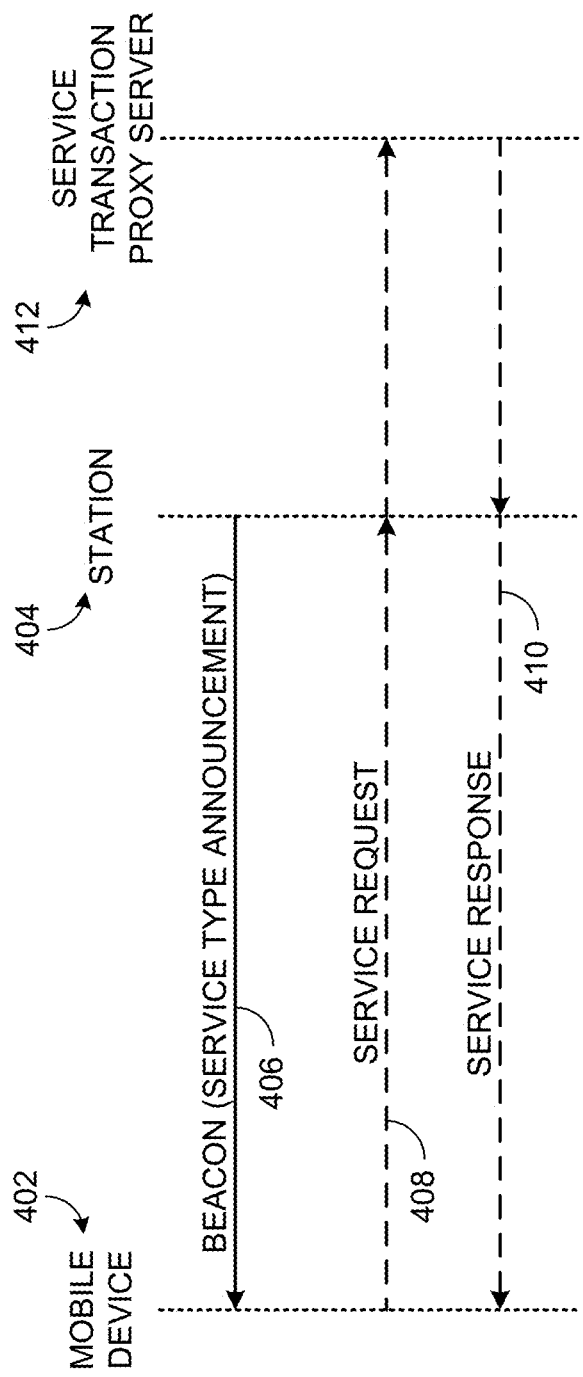
FIG. 4 is an example signaling diagram involving conveyance of a service type announcement in a layer 2 frame.

FIG. 4 is an example signaling diagram involving conveyance of a service type announcement in a layer 2 frame. The signaling diagram involves frames sent between a mobile device 402 and a station (STA) 404, such as a mobile device, a mesh node, or an access point. The STA 404 supports a wireless network. A beacon frame 406 broadcast by the STA 404 conveys a service type announcement, and is receivable by the mobile device 402. As discussed above with reference to FIG. 3-2, responsive to receiving the beacon frame 406, determining the announced service type or types (and, if present, any identifiers of ULPs) from the beacon frame 406, and determining whether the mobile device 402 can make use of the announced service type or types (and, if present, any identifiers of ULPs) to a service table, the mobile device 402 may generate a service request 408 and transmit the service request 408 to the STA 404. Subsequently, the mobile device 402 may receive a service response 410 from the STA 404. The STA 404 may handle the service request 408 and generate the service response 408. Alternatively, the STA 404 may forward the service request 408 to a service transaction proxy (TXP) server 412 and may receive the service response 410 from the service TXP server 412. The service TXP server 412 may conduct its own queries (not shown) within a network coupled to the wireless network in order to generate the service response 410. This may lead to a delay of up to 10 seconds, and may result in the mobile device 402 resending the service request 408 in order to receive the service response 410. Although not illustrated as such, the service TXP server 412 may be implemented within the STA 404.

Figure 5:
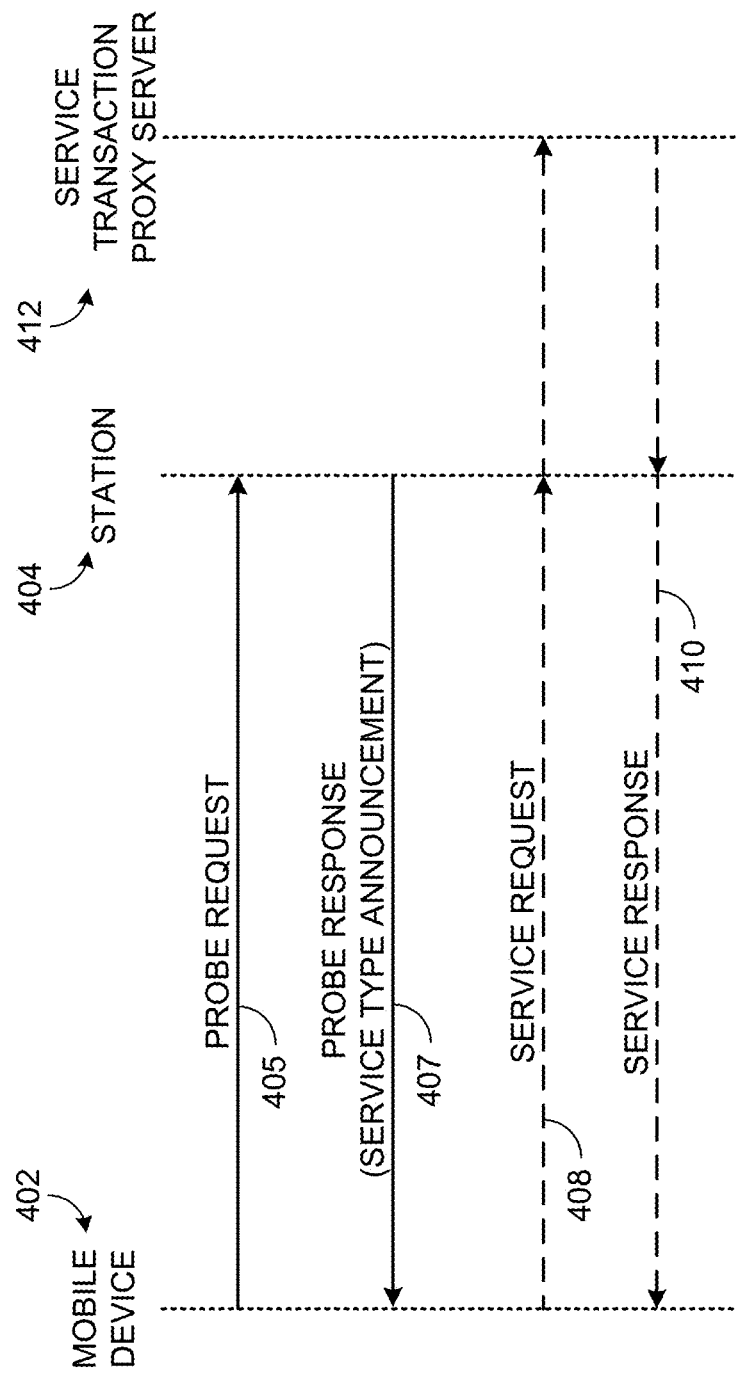
FIG. 5 is another example signaling diagram involving conveyance of a service type announcement in a layer 2 frame.

FIG. 5 is another example signaling diagram involving conveyance of a service type announcement in a layer 2 frame. As with FIG. 4, the signaling diagram involves frames sent between the mobile device 402 and the STA 404, which supports a wireless network. A probe request frame 405 broadcast by the mobile device 402 does not contain any service requests and does not enquire as to the service type or types that are available within or accessible via a wireless network. The STA 404 responds to the probe request frame 405 with a probe response frame 407 that conveys a service type announcement. Generation of the service request 408, transmission of the service request 408 to the STA 404, and reception of the service response 410 in response to the service request 408 may follow as discussed above with reference to FIG. 4.

Generic Advertisement Service (GAS) may be used as the transport mechanism for communication of the service request 408 from the mobile device 402 to the STA 404 (which is responsible for relay of the service request 408 to the service TXP server 412) and for communication of the service response 410 (received by the STA 404 from the service TXP server 412) to the mobile device 402. In an alternative implementation, Access Network Query Protocol (ANQP) may be used as the transport mechanism for the communication of the service request 408 from the mobile device 402 to the STA 404 and for communication of the service response 410 to the mobile device 402.

Figure 6:
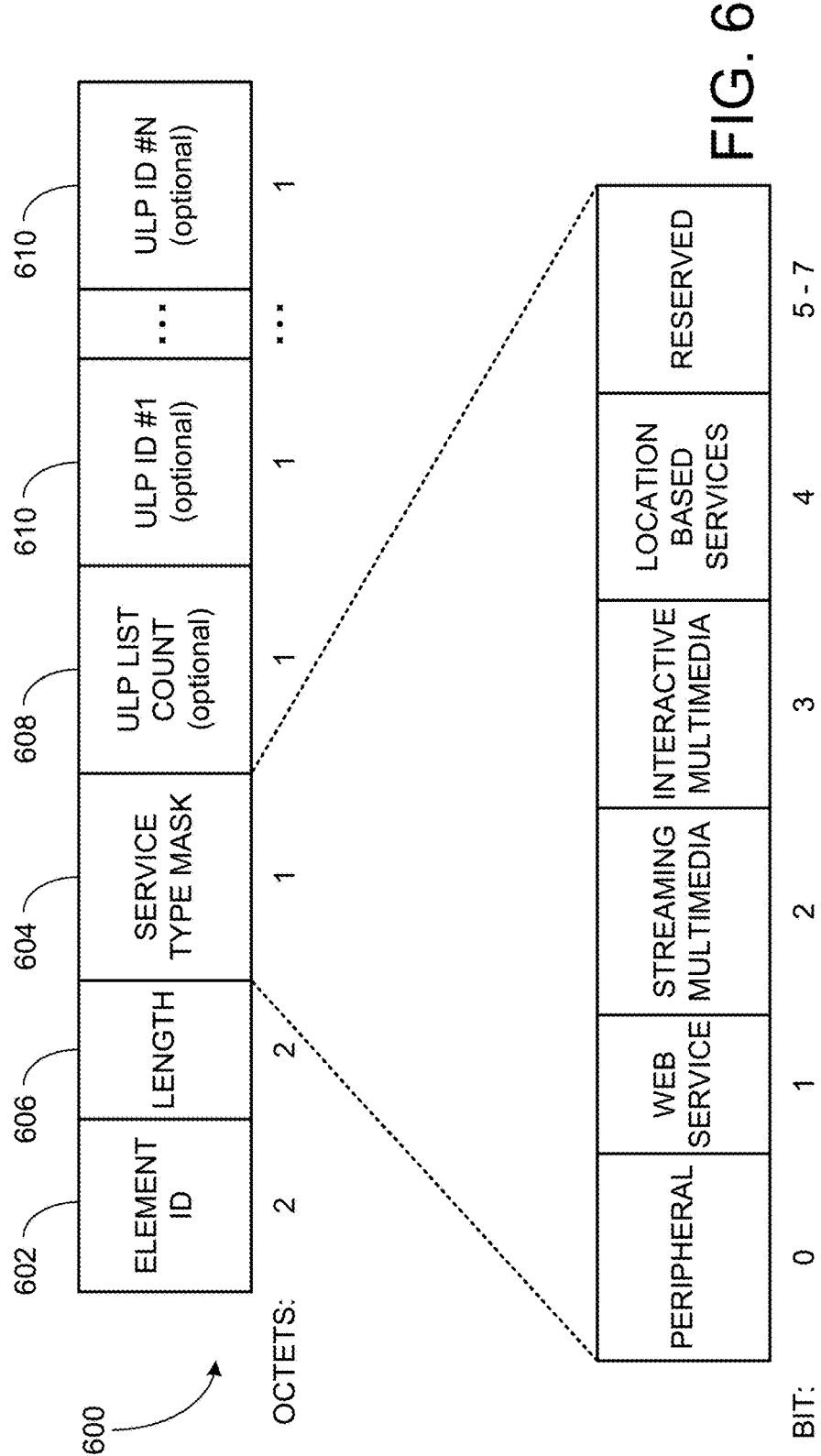
FIG. 6 illustrates example formatting information for a Service Type Announcement element.

FIG. 6 illustrates example formatting information for a Service Type Announcement element 600. In order that the announcement is receivable by mobile devices in the pre-associated state, the size of the Service Type Announcement element 600 complies with any upper limit on the size of an element in the pre-associated state.

An Element ID field 602 which is two octets in length includes a value indicating that the element is a Service Type Announcement element 600.

A Service Type Mask field 604 which is one octet in length stores a bit mask, where each bit indicates that a specific type of service is available within or accessible via the wireless network. Support for up to eight different service types may be indicated using the Service Type Mask field. (If support for up to sixteen different service types is of interest, then the Service Type Mask field 604 should be of two octets in length. If support for more service types is required, then the Service Type Mask Field 604 is correspondingly larger.) With the example formatting information for the Service Type Mask field 604 illustrated in FIG. 6, setting the zeroth bit to '1' indicates that services of the type 'Peripheral' are available within or accessible via the wireless network, setting the first bit to '1' indicates that services of the type 'Web Service' are available within or accessible via the wireless network, setting the second bit to '1' indicates that services of the type 'Streaming Multimedia' are available within or accessible via the wireless network, setting the third bit to '1' indicates that services of the type 'Interactive Multimedia' are available within or accessible via the wireless network, and setting the fourth bit to '1' indicates that services of the type 'Location Based Services' are available within or accessible via the wireless network. The fifth, sixth and seventh bits are reserved for future service types. For example, the bit mask '01100bbb' indicates that services of the type 'Web Service' and services of the type 'Streaming Multimedia' are available within or accessible via the wireless network, and indicates that services of the types 'Peripheral', 'Interactive Multimedia' and 'Location Based Services' are not available within or accessible via the wireless network.

A Length field 606 which is two octets in length stores the total length of the element. The length of the element may vary, because identifications of one or more upper layer protocols (ULPs) supported by the wireless network may be included in the element. In the event that at least one ULP is identified in the element, the element includes a ULP List Count field 608 which is one octet in length and has the number of ULPs identified in the element. Each optional ULP identification field 610 contains a one-octet identifier of a specific upper layer protocol. For example, the ULP identifiers may be taken from the following table:

TABLE 2

Upper Layer Protocol (ULP) Identifiers

| ULP ID | ULP name | ULP Abbreviation |
| --- | --- | --- |
| 0 | List of available ULPs | — |
| 1 | DNS Service Discovery, part of Apple's Bonjour ® technology | DNS-SD, Bonjour ® |
| 2 | Service Location Protocol | SLP |
| 3 | Simple Service Discovery Protocol as used in Universal Plug and Play | SSDP, UPnP |
| 4 | Universal Description Discovery and Integration for web services | UDDI |
| 5 | Jini for Java objects | JINI |
| 6 | Bluetooth Service Discovery Protocol | SDP |
| 7 | Salutation | Salutation |
| 8 | XMPP Service Discovery | XEP-0030 |
| 9 | Web Services Dynamic Discovery | WS-Discovery |
| 10 | multicast DHCP | MDHCP |
| 11 | Internet Storage Name Service | iSNS |
| 12 | Web Proxy Autodiscovery Protocol | WPAD |
| 13 | Dynamic Host Configuration Protocol | DHCP |
| 14 | eXtensible Resource Descriptor Sequence | XRDS |
| 15 | e911 (Emergency Service) | e911 |
| 16 | Next Generation 911 (Emergency Service) | NG911 |
| 17 | Location Service | Location |
| 18-255 | Reserved | — |

Figures 1, 7:
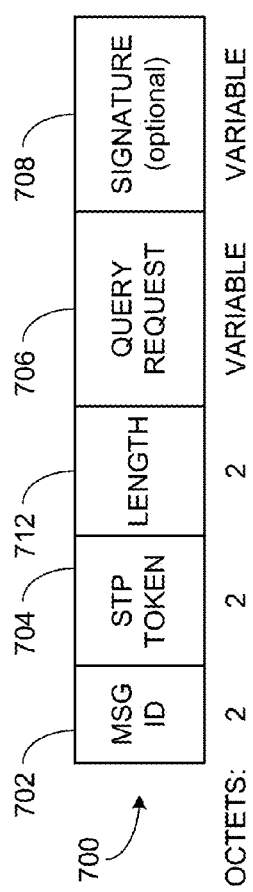
Figures 2, 7:
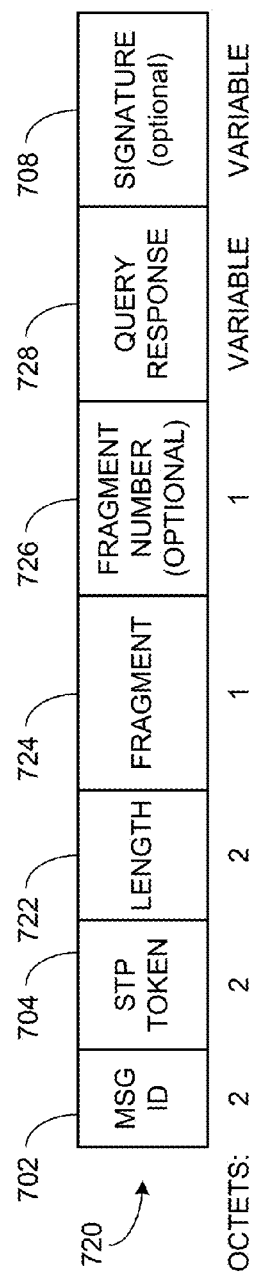
Figures 3, 7:
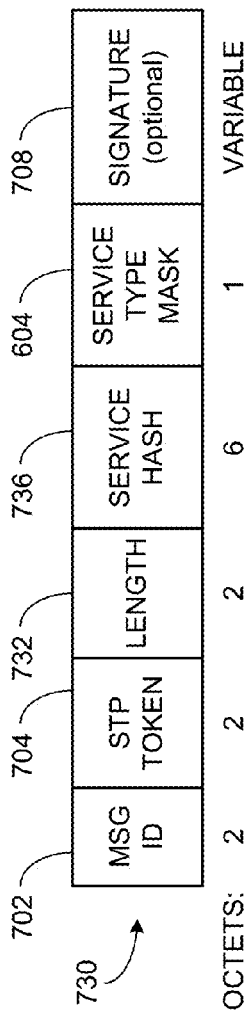

FIG. 7-1 illustrates example formatting information for a service query request message 700. A Message ID field 702 which is two octets in length includes a value indicating that the message 700 is a Service Transaction Protocol (STP) message of type "Service Query Request". For example, using the example list of STP message identifiers in the following table, the Message ID field 702 includes the value 2.

TABLE 3

STP Message Definitions

| ID | STP message |
| --- | --- |
| 0 | Reserved |
| 1 | Encapsulation |
| 2 | Service Query Request |
| 3 | Service Query Response |
| 4 | Return Code |
| 5 | Certificate |
| 6 | Location |
| 7 | Service Descriptor Request |
| 8 | Service Descriptor Response |
| 9-220 | Reserved |
| 221 | Vendor Specific |
| 222-255 | Reserved |

A STP Token field 704 which is two octets in length stores a token to be used for matching STP messages when there are multiple concurrent messages between the mobile device and the service TXP server.

A Query Request field 706 of variable length may carry a free text query string (for example, "printer" or a specific identifier identifying a specific service). An empty string will result in all services being returned by the service TXP server. A protocol such as UNIX POSIX may be used for the matching patterns (for example, "3DPrinter*" where the asterisk "*" indicates a match to any trailing string pattern). Alternatively, the Query Request field 706 may carry a service query request code (for example, a service identifier hash) retrieved from a service table at the mobile device.

An optional Signature field 708 of variable length allows a cryptographic signature to be generated by the transmitting device (for example, using an elliptic curve algorithm) using the contents of the frame together with a secure identity. The signature, once verified, provides authenticity of the contents of the message.

A Length field 712 which is two octets in length stores the total number of octets in the Query Request field 706 and in the Signature field 708 (if present).

FIG. 7-2 illustrates example formatting information for a service query response message 720. The Message ID field 702 includes a value indicating that the message 720 is a STP message of type "Service Query Response". For example, using the example list of STP message identifiers in TABLE 3, the Message ID field 702 includes the value 3. The STP Token field 704 and the optional Signature field 708 are as described above with reference to FIG. 7-1.

A Fragment field 724 which is one octet in length is set to 1 in the event that the response is fragmented over several STP messages and there are more fragmented STP responses to follow. Un-fragmented STP responses (or the last fragment) have this field set to 0. An optional Fragment Number field 726 indicates the number of the specific fragment, to allow for re-ordering or error checking in the event that a fragment is not transmitted correctly.

A Query Response field 728 of variable length carries response information (for example, a list of IP addresses, universal resource identifiers (URIs) or universal resource locators (URLs) of any known providers of the service).

A Length field 722 which is two octets in length stores the total number of octets in the Query Response field 728 and in the Signature field 708 (if present) and in the Fragment Number field 726 (in the event that the Fragment field 724 is not set to 0).

FIG. 7-3 illustrates example formatting information for a service descriptor request message 730. The Message ID field 702 includes a value indicating that the message 730 is a STP message of type "Service Descriptor Request". For example, using the example list of STP message identifiers in TABLE 3, the Message ID field 702 includes the value 7. The STP Token field 704 and the optional Signature field 708 are as described above with reference to FIG. 7-1.

Instead of the Query Request field 706, the service descriptor request message 730 includes a Service Hash field 736 which is six octets in length, followed by a Service Type Mask field 604 as described above with reference to FIG. 6. The Service Hash field 736 is used to identify the specific service that the mobile device is trying to discover. An empty field (or a value of zero) will result in all service descriptors being returned by the service TXP server. The Service Type Mask field 604 is used as part of the service descriptor request message 730 to search for specific service types that are available within or accessible via the wireless network in which the service TXP server is located. A value of zero indicates that all service types are being requested.

A Length field 732 which is two octets in length stores the total number of octets in the Signature field 708 (if present).

FIG. 7-4 illustrates example formatting information for a service descriptor response message 750. The Message ID field 702 includes a value indicating that the message 730 is a STP message of type "Service Descriptor Response". For example, using the example list of STP message identifiers in TABLE 3, the Message ID field 702 includes the value 8. The STP Token field 704 and the optional Signature field 708 are as described above with reference to FIG. 7-1.

A Length field 752 is set to the total number of octets in the Service Descriptor List Count field 754, in all Service Descriptor fields 756 (if present) and in the Signature field 708 (if present).

The Service Descriptor List Count field 754 which is one octet in length and has the number of Service Descriptor fields included in the message. Each optional Service Descriptor field 756 may have example formatting information as follows.

A Length sub-field 762 which is two octets in length stores the total number of octets in a Service Hash sub-field 764, in an Additional Attributes Count sub-field 766, in all Additional Attribute sub-fields 768 (if present), and in a ULP identification sub-field 770 (if present).

As is the case for the Service Hash field 736, the Service Hash sub-field 764 is six octets in length. The Service Hash sub-field 764 stores a service hash that is used to identify a service that is available within or accessible via the wireless network.

The Additional Attributes Count sub-field 766 which is one octet in length contains the number of Additional Attribute sub-fields 768.

Each Additional Attribute sub-field 768 is, for example, four octets in length and contains an attribute or information associated with the service identified by the service hash stored in the Service Hash sub-field 764. For example, the attribute or information contained therein may be '3D printer' or 'DLNA renderer and control point' or 'authentication required'.

The ULP identification sub-field 770 contains a one-octet identifier of a specific upper layer protocol. Example ULP identifiers are provided above in TABLE 2. The value of the ULP identification sub-field 770 may be used by the mobile device, responsive to receiving the Service Descriptor message, to assist in parsing or matching the value of the Service Hash sub-field 764, in the event of a conflict.

FIG. 7-5 illustrates example formatting information for a certificate message 780. The certificate message 780 may be sent from the mobile device to the service TPX server to instruct the service TPX server to send signed messages. The certificate message 780 may be sent from the service TPX server to the mobile device to provide the mobile device with a certificate that can be used by the mobile device to verify the signature in signed messages.

The Message ID field 702 includes a value indicating that the message 780 is a STP message of type "Certificate". For example, using the example list of STP message identifiers in TABLE 3, the Message ID field 702 includes the value 5. The STP Token field 704 is as described above with reference to FIG. 7-1.

A Length field 782 is set to the total number of octets in a Certificate field 784 of variable length, in a Validity Length field 786 and in a Certificate Validity field 788 of variable length. Setting the Length field 782 to zero indicates to the service TPX server that the mobile device wishes to use signed messages. If the value of the Length field 782 is not zero, then 1) the Certificate field 784 stores a certificate from the service TPX server and it is assumed that it includes the service TPX server's public key that forms a private key—public key pair with the private key used by the service TPX server to sign the signed messages, 2) the Validity Length field 786 is set to the number of octets of the Certificate Validity field 788, and 3) the Certificate Validity field 788 includes expiration information for the certificate. The Certificate Validity field 788 may also contain information about the certificate, for example, how to request a new certificate.

Figure 8:
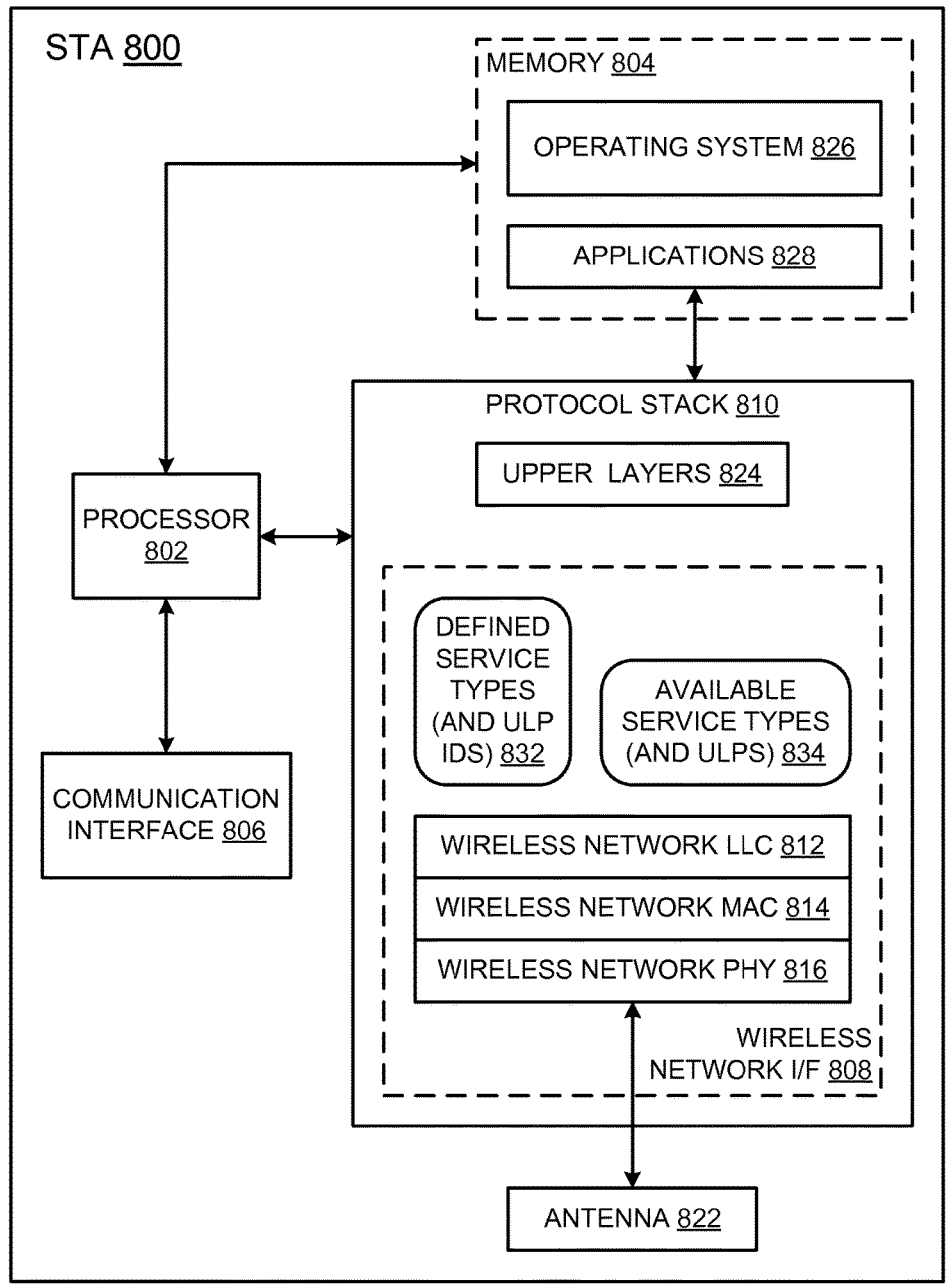
FIG. 8 is a block diagram of an example station (STA), such as a mobile device, a mesh node, or an access point.

FIG. 8 is a block diagram of an example station (STA) 800. The STA 800 comprises a processor 802 coupled to a memory 804 and to a communication interface 806. Communication interface 806 may be a wired communication interface, a satellite interface, a Worldwide Interoperability for Microwave Access (WiMAX®) communication interface, or any other suitable communication interface. The STA 800 also comprises a wireless network interface 808 within a protocol stack 810 that is coupled to the processor 802. The wireless network interface 808 comprises a physical layer 1 module 816, a MAC module 814 at a lower sub-layer of layer 2, and an LLC module 812 at an upper sub-layer of layer 2. The STA 800 also comprises an antenna 822 coupled to the physical layer 1 module 816. The protocol stack 810 may comprise upper layers 824. The MAC module 814 may implement the example method illustrated in FIG. 2.

The memory 804 may store an operating system 826 to be executed by the processor 802. The memory 804 may store applications 828 installed in the STA 800 to be executed by the processor 802. Examples of the applications 828 include a configuration application that enables a network administrator to configure parameters of the wireless network, for example, its network name.

The wireless network interface 808 may store in its memory the defined service types and identifiers of ULPs (for example, the ULP identifiers in TABLE 2), possibly in one or more registers 832. The wireless network interface 808 may store in its memory indications of which service type or types and which ULPs are available within or accessible via the wireless network. Those indications may be stored in one or more registers 834. The MAC module 814 may access the indications when of available service types and available ULPs when generating a service type announcement as described above with respect to FIG. 2.

The STA 800 may comprise other elements that, for clarity, are not illustrated in FIG. 8. Likewise, the STA 800 may comprise a subset of the elements illustrated in FIG. 8.

Figure 9:
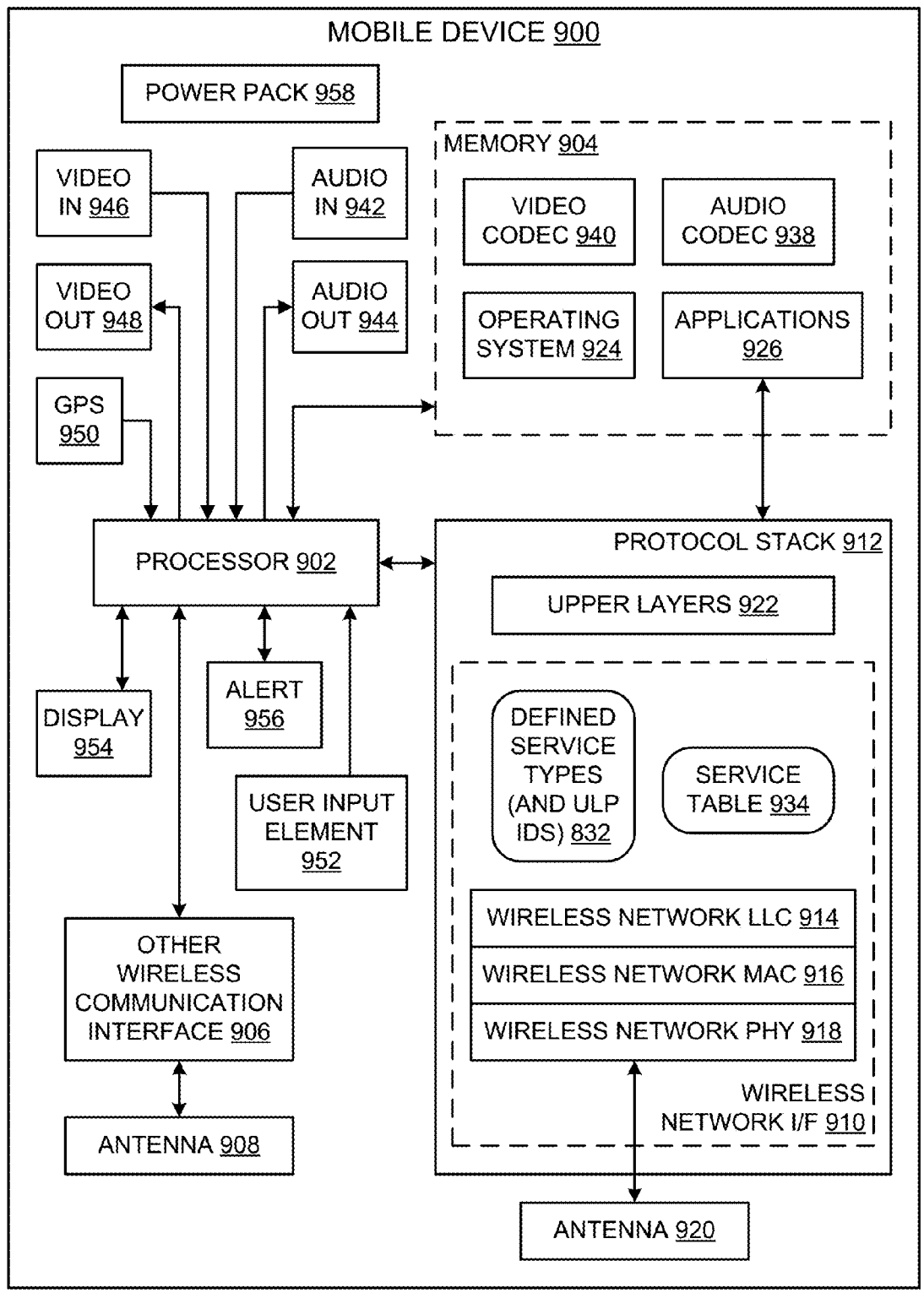
FIG. 9 is a block diagram of an example mobile device.

FIG. 9 is a block diagram of an example mobile device 900. A mobile device 900 comprises a processor 902 coupled to a memory 904 and optionally to one or more other wireless communication interfaces 906. For example, wireless communication interfaces 906 may comprise a short-range wireless communication interface such as a wireless personal area network interface. In another example, wireless communication interfaces 906 may comprise a wireless wide area network (WWAN) interface such as for cellular communications. One or more antennas 908 may be coupled to respective ones of the wireless communication interfaces 906. An antenna may be shared among more than one wireless interface.

The mobile device 900 also comprises a wireless network interface 910 within a protocol stack 912 that is coupled to processor 902. The wireless network interface 910 comprises a physical layer 1 module 918, a MAC module 916 at a lower sub-layer of layer 2, and an LLC module 914 at an upper sub-layer of layer 2. The mobile device 900 also comprises an antenna 920 coupled to the physical layer 1 module 918. The protocol stack 912 may comprise upper layers 922.

The memory 904 may store an operating system 924 to be executed by the processor 902. The memory 904 may store applications 926 installed in the mobile device 900 be executed by the processor 902. The memory 904 may also store data (not shown) used by operating system 924 and applications 926.

The wireless network interface 910 may store in its memory the defined service types and identifiers of ULPs (for example, the ULP identifiers in TABLE 2), possibly in one or more registers 832. A service table 934 is stored in memory of the wireless network interface 910, to be accessed by the MAC module 916 as described above with respect to the example methods illustrated in FIG. 3-1 and FIG. 3-2.

The memory 904 may store an audio coder-decoder (codec) 938 or a video codec 940 or both. The mobile device 900 may comprise an audio input element 942 and an audio output element 944, both coupled to the processor 902. The mobile device 900 may comprise a video input element 946 and a video output element 948, both coupled to the processor 902.

The mobile device 900 may comprise a Global Positioning System (GPS) module 950 coupled to the processor 902.

The mobile device 900 may comprise one or more user input elements 952 coupled to the processor 902. Examples of user input elements include a keyboard, a keypad, a touchscreen, a joystick, a thumbwheel, a roller, a touchpad, a trackpad, a capacitive touch pad, an optical touch pad, and any other type of navigation actuator.

The mobile device 900 may comprise one or more user output elements coupled to the processor 902, of which a display 954 is illustrated. In the event that the display 954 is a touchscreen, it functions also as a user input element.

The mobile device 900 may comprise one or more alert components 956 coupled to the processor 902, to be activated in order to alert a user, for example, by sounding a buzzer, playing a ringtone, emanating light, or vibrating.

The mobile device 900 may include mechanical interfaces, such as a power connector jack, a data interface port such as a Universal Serial Bus (USB) port, a headphone jack, and other mechanical interfaces that are not explicitly shown.

The mobile device 900 comprises a power pack 958 that provides power to the other components of the mobile device 900.

The mobile device 900 may comprise other elements that, for clarity, are not illustrated in FIG. 9. Likewise, the mobile device 900 may comprise a subset of the elements illustrated in FIG. 9.

As described above with respect to FIG. 3-1 and FIG. 3-2, a mobile device may determine whether it can make use of any of the announced service types by comparing the announced service type or types to a service table stored internally (that is, locally) at the mobile device. The contents of a service table could be initially populated or updated (or both) manually. Alternatively, as a new service is made available in the mobile device's operating system (for example, as a new application is installed at the mobile device), the service table could be updated automatically.

As described above with respect to FIG. 2, a station (STA), such as a mobile device, a mesh node or an access point, maintains indications of service types and ULPs that are available within or accessible via a wireless network. Those indications may be initially provisioned or updated (or both) manually. Alternatively, those indications may be provisioned remotely from a central service server which manages the STA. Alternatively, those indications may be provisioned by having the STA listen to or query networks with which it is coupled or connected.

Alternatively, any entity (such as a mobile device, a mesh node or an access point) could signal the contents of the service table to the mobile device or could signal the indications to the station, either over the wireless network or using some out-of-band mechanism.

Figure 10:
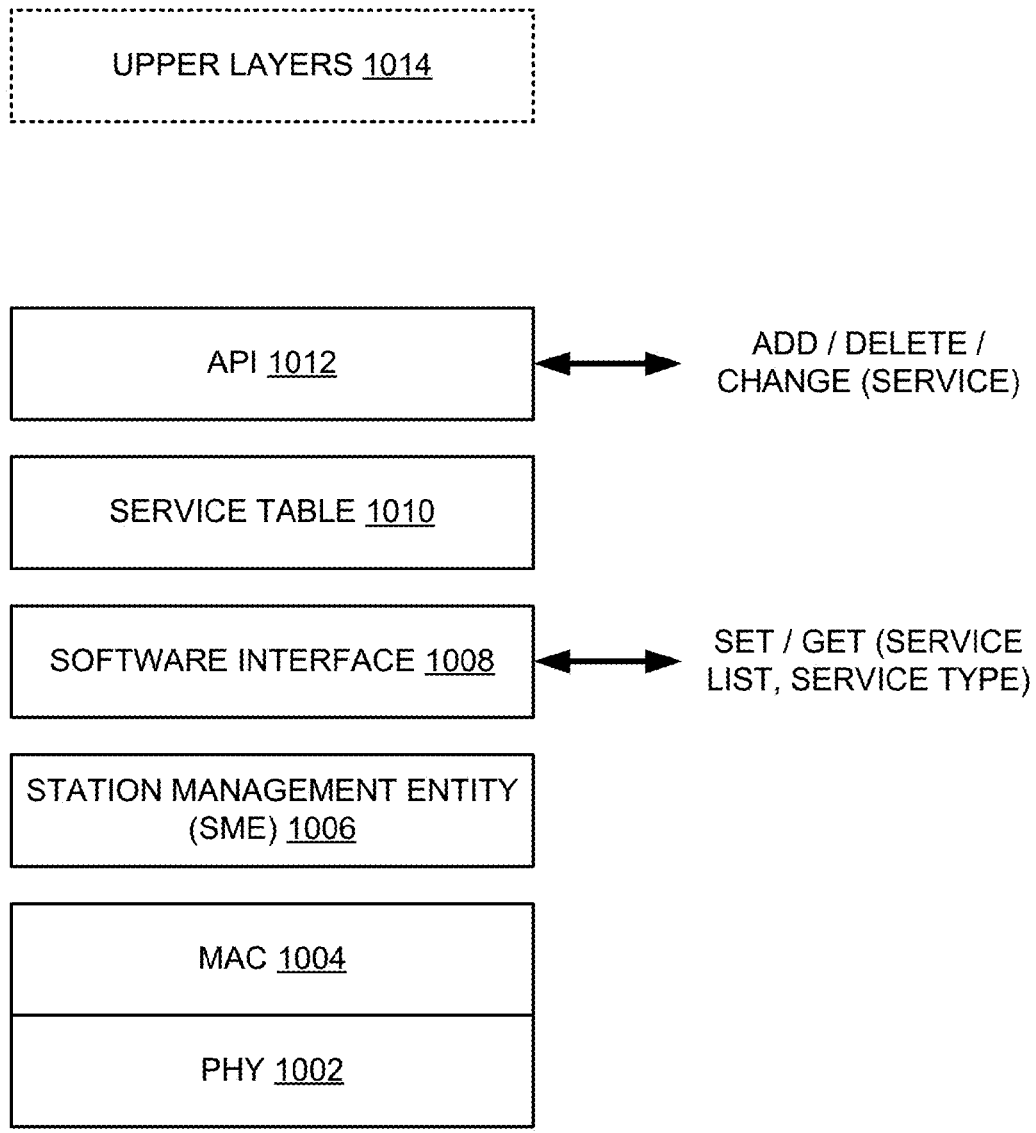
FIG. 10 illustrates an example architecture for a service table.

FIG. 10 illustrates an example architecture for a service table. A Physical Layer 1002 is the first (lowest) layer. A MAC sub-layer 1004 is above the Physical Layer 1002. A Station Management Entity (SME) 1006 above the MAC sub-layer 1004 provides a software interface 1008 (via pre-association messages) to the service table, which sits immediately above the SME 1006. The software interface 1008 typically uses SET and GET software commands to read and write service types and service information to the lower layers. The service table 1010 itself then provides an exposed Application Programming Interface (API) 1012 comprising ADD, DELETE and CHANGE software commands which can modify the contents of the service table 1010. The API then allows upper layer protocols (ULPs) 1014 to interact with the service table 1010.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A service type announcement method performed by an access point that supports a wireless network, the method comprising:

generating a service type announcement element comprising a length field, an element identifier field providing an indication that the element is a service type announcement element, and a service type bit mask having a variable length in octets, wherein each bit of the service type bit mask represents a respective one of a plurality of network service types, the network service types comprising one or more of peripheral service type, web service type, streaming multimedia service type, interactive multimedia service type, and location based service type, and wherein the service type bit mask indicates that at least one of the network service types is available within or accessible via the wireless network;

transmitting the service type announcement element to a mobile device by including the service type announcement element in a beacon frame or in a probe response frame; and transmitting the beacon frame or the probe response frame by the access point to the mobile device, wherein the mobile device is configured to:

make a determination whether any of the at least one network service type indicated as being available or accessible in the received service type bit mask is a matching network service type, by the mobile device comparing the service type bit mask with a list of network service types categorizing particular network services required by applications on the mobile device, the list being accessible to the mobile device; and implement a network selection algorithm based on the determination.

2. A service type discovery method performed by a mobile device, the method comprising:
receiving a beacon frame transmitted by an access point that supports a wireless network or a probe response frame transmitted by the access point to the mobile device, the beacon frame or the probe response frame including a service type announcement element, the service type element comprising a length field, an element identifier field providing an indication that the element is a service type announcement element, and a service type bit mask having a variable length in octets, wherein each bit of the service type bit mask represents a respective one of a plurality of network service types, the network service types comprising one or more of peripheral service type, web service type, streaming multimedia service type, interactive multimedia service type, and location based service type, and wherein the service type bit mask indicates that at least one of the network service types is available within or accessible via the wireless network;
making a determination whether any of the at least one network service type indicated as being available or accessible in the received service type bit mask is a matching network service type, by the mobile device comparing the service type bit mask with a list of network service types categorizing particular network services required by applications on the mobile device, the list being accessible to the mobile device; and
implementing a network selection algorithm based on the determination.

3. The service type discovery method as claimed in claim 2, further comprising:
determining from the service type announcement element the at least one network service type available within or accessible via the wireless network; and
responsive to determining from the service type announcement element the at least one network service type available within or accessible via the wireless network, generating and transmitting a service request to the wireless network.

4. The service type discovery method as claimed in claim 3, further comprising:
receiving from the wireless network a service response to the service request.

5. The service type discovery method as claimed in claim 4, further comprising:
providing the service response to the network selection algorithm.

6. The service type discovery method as claimed in claim 3, wherein the service request is a service descriptor request.

7. The service type discovery method as claimed in claim 6, wherein the service descriptor request makes reference to one or more network service types.

8. The service type discovery method as claimed in claim 2, wherein the mobile device is in a pre-associated state with respect to the wireless network while performing the service type discovery method.

9. An access point comprising:
a processor; and
a wireless network interface coupled to the processor, the wireless network interface configured to:
support a wireless network;
generate a service type announcement element comprising a length field, an element identifier field providing an indication that the element is a service type announcement element, and a service type bit mask having a variable length in octets, wherein each bit of the service type bit mask represents a respective one of a plurality of network service types, the network service types comprising one or more of peripheral service type, web service type, streaming multimedia service type, interactive multimedia service type, and location based service type, and wherein the service type bit mask indicates that at least one of the network service types is available within or accessible via the wireless network; and
transmit the service type announcement element to a mobile device by
including the service type announcement element in a beacon frame or in a probe response frame; and
transmitting the beacon frame or the probe response frame by the access point to the mobile device, and
wherein the mobile device is configured to:
make a determination whether any of the at least one network service type indicated as being available or accessible in the received service type bit mask is a matching network service type, by the mobile device comparing the service type bit mask with a list of network service types that categorize particular network services required by applications on the mobile device, the list being accessible to the mobile device; and
implement a network selection algorithm based on the determination.

10. A mobile device comprising:
a processor; and
a wireless network interface coupled to the processor, the wireless network interface configured to:
receive a beacon frame transmitted by an access point that supports a wireless network or a probe response frame transmitted by the access point to the mobile device, the beacon frame or the probe response frame including a service type announcement element, the service type element comprising a length field, an element identifier field providing an indication that the element is a service type announcement element, and a service type bit mask having a variable length in octets, wherein each bit of the service type bit mask represents a respective one of a plurality of network service types, the network service types comprising one or more of peripheral service type, web service type, streaming multimedia service type, interactive multimedia service type, and location based service type, and wherein the service type bit mask indicates that at least one of the network service types is available within or accessible via the wireless network; and
the processor configured to:
make a determination whether any of the at least one network service type indicated as being available or accessible in the received service type bit mask is a matching network service type, by the mobile device comparing the service type bit mask with a list of network service types categorizing particular network services required by applications on the mobile device, the list being accessible to the mobile device; and
implement a network selection algorithm based on the determination.

11. The mobile device as claimed in claim 10, wherein the wireless network interface is further configured to:

determine from the service type announcement element the at least one network service type available within or accessible via the wireless network; and responsive to determining from the service type announcement element the at least one network service type available within or accessible via the wireless network, generate and transmit a service request to the wireless network.

12. The mobile device as claimed in claim 11, wherein the wireless network interface is further configured to receive from the wireless network a service response to the service request.

13. The mobile device as claimed in claim 12, wherein the wireless network interface is further configured to provide the service response to the network selection algorithm.

14. The mobile device as claimed in claim 11, wherein the service request is a service descriptor request.

15. The mobile device as claimed in claim 14, wherein the service descriptor request makes reference to one or more network service types.

* * * * *